United States Patent [19]

Morimoto et al.

[11] Patent Number: 4,734,821

[45] Date of Patent: Mar. 29, 1988

[54] ELECTROLYTIC CAPACITOR

[75] Inventors: Takeshi Morimoto; Yoshiki Hamatani; Toshiya Matsubara, all of Yokohama; Naoto Iwano; Hideo Shimizu, both of Fujisawa, all of Japan

[73] Assignees: Asahi Glass Company Ltd., Tokyo; Elna Company Ltd., Fujisawa, both of Japan

[21] Appl. No.: 49,297

[22] Filed: May 13, 1987

[30] Foreign Application Priority Data

| May 13, 1986 [JP] | Japan | 61-107769 |
| May 20, 1986 [JP] | Japan | 61-113484 |
| May 20, 1986 [JP] | Japan | 61-113485 |
| Sep. 11, 1986 [JP] | Japan | 61-212611 |

[51] Int. Cl.$^4$ .............................................. H01G 9/00
[52] U.S. Cl. .................................... 361/433; 252/62.2
[58] Field of Search ............... 252/567, 62.2; 361/433, 361/323, 314, 315

[56] References Cited

U.S. PATENT DOCUMENTS

| 3,300,693 | 1/1967 | Ross et al. ...................... 252/62.2 X |
| 3,678,345 | 7/1972 | Hyidtfeldt et al. .................. 361/433 |
| 4,117,531 | 9/1978 | Ross et al. ............................ 361/433 |
| 4,245,278 | 1/1981 | Finkelstein et al. ................ 361/433 |
| 4,522,737 | 6/1985 | MacNamee ........................ 252/62.2 |

Primary Examiner—Donald A. Griffin
Attorney, Agent, or Firm—Oblon, Fisher, Spivak, McClelland & Maier

[57] ABSTRACT

An electrolytic capacitor comprising a capacitor element and an electrolyte impregnated to the element, wherein the electrolyte comprises an organic polar solvent and a solute dissolved in the solvent, said solute being selected from the group consisting of a quaternary ammonium salt of an aromatic carboxylic acid, a quaternary ammonium salt of cycloalkene carboxylic acid and a quaternary ammonium salt of an unsaturated aliphatic carboxylic acid.

13 Claims, No Drawings

ELECTROLYTIC CAPACITOR

BACKGROUND OF THE INVENTION

1. Field of the Invention

The present invention relates to an electrolytic capacitor wherein a novel electrolyte is used.

2. Discussion of the Background

An electrolytic capacitor having a capacitor element prepared by rolling foils of a valve metal such as aluminum together with a separator, usually has a structure wherein an electrolyte is impregnated to the capacitor element, and such a capacitor element is accomodated and sealed in a metal casing such as an aluminum casing or in a casing made of a synthetic resin.

Heretofore, as an electrolyte for such an electrolytic capacitor, it has been common to employ an electrolyte obtained by using ethylene glycol or the like as the main solvent and dissolving therein a salt which does not corrode metal electrodes, such as an ammonium salt of a saturated organic acid, as the solute (see e.g. Japanese Examined Patent Publication No. 13019/1983). However, it is common to add from 1 to 30% of water to such an electrolyte to increase the conductivity, whereby there has been a drawback that a degradation of the high temperature properties, such as a change in the tangent of loss angle (tan δ) or a leakage current in the high temperature storage test, is substantial due to the corrosion of the cathode foil or due to the evaporation of the dissociated ammonia ($NH_3$). Thus, such an electrolyte is not fully satisfactory for use in the industrial equipments where a high level of reliability is required.

Further, Japanese Unexamined Patent Publication No. 78522/1984 proposes to use an electrolyte obtained by dissolving a quaternary ammonium salt of a saturated aliphatic dibasic carboxylic acid in an organic polar solvent, as an electrolyte having a high conductivity (i.e. a low electrical resistance) and stability at high temperatures. However, the quality of such an electrolyte is still inadequate for the present level of requirements.

It is also known to use an amine salt of maleic acid as an electrolyte (Japanese Examined Patent Publication No. 37852/1984) to obtain an electrolyte solution having a low specific resistance. However, such an electrolyte solution is still inadequate to meet the electrolyte properties presently required (specific resistance, thermal stability).

SUMMARY OF THE INVENTION

It is an object of the present invention to overcome the above-mentioned drawbacks and to provide a highly reliable electrolytic capacitor by presenting a non-aqueous electrolyte having excellent heat stability with a minimum water content.

The present invention provides an electrolytic capacitor comprising a capacitor element and an electrolyte impregnated to the element, wherein the electrolyte comprises an organic polar solvent and a solute dissolved in the solvent, said solute being selected from the group consisting of a quaternary ammonium salt of an aromatic carboxylic acid, a quaternary ammonium salt of a cycloalkene carboxylic acid and a quaternary ammonium salt of an unsaturated aliphatic carboxylic acid.

DETAILED DESCRIPTION OF THE PREFERRED EMBODIMENTS

Firstly, the quaternary ammonium salt of an aromatic carboxylic acid will be described.

In the present invention, the aromatic carboxylic acid is preferably an aromatic monobasic, dibasic, tribasic or tetrabasic acid, more preferably, a monobasic, dibasic or tetrabsic acid. The aromatic ring is preferably of a monocyclic type. When the aromatic ring has a plurality of carboxylic acid groups, such carboxylic acid groups are preferably located at the adjacent positions. The carboxylic acid group or groups are preferably directly attached to the aromatic ring. Specific examples of preferred aromatic carboxylic acids include benzoic acid, phthalic acid, salicylic acid, resorcylic acid, benzene-tricarboxylic acid and benzene-tetracarboxylic acid. Among them, phthalic acid, particularly o-phthalic acid, is preferred. Specific examples of the quaternary ammonium salts of o-phthalic acid include tetramethylammonium o-phthalate, tetraethylammonium o-phthalate, tetrapropylammonium o-phthalate and tetrabutylammonium o-phthalate.

In the present invention, to obtain an electrolyte containing the quaternary ammonium salt of an aromatic carboxylic acid, the above quaternary ammonium salt may be added to an organic polar solvent. Alternatively, the quaternary ammonium salt may be formed in the solvent by adding starting materials capable of forming the quaternary ammonium salt, for example, an aromatic carboxylic acid or its anhydride and a tetraalkylammonium hydroxide, independently to the solvent. For example, to obtain an electrolyte containing a quaternary ammonium salt of o-phthalic acid, the quaternary ammonium salt may be added to an organic polar solvent, or the quaternary ammonium salt may be formed by reacting o-phthalic acid with a substance capable of forming the quaternary ammonium salt, in the solvent.

When the aromatic carboxylic acid is a dibasic, tribasic or tetrabasic acid, the quaternary ammonium salt of such an aromatic carboxylic acid is preferably an acidic salt. If the carboxylic groups on the aromatic ring are all neutralized with the quaternary ammonium ions, the pH of the electrolyte tends to be too high and corrosion of the capacitor material is likely to be brought about.

The cycloalkene carboxylic acid is preferably tetrahydrophthalic acid or tetrahydrophthalic acid anhydride. More specifically, it includes $\Delta^1$ to $\Delta^4$-tetrahydrophthalic acids i.e. cyclohexene-1,2-dicarboxylic acid, cyclohexene-1,6-dicarboxylic acid, cyclohexene-3,4-dicarboxylic acid, cyclohexene-4,5-dicarboxylic acid and their anhydrides. Among them, $\Delta^4$-tetrahydrophthalic acid i.e. cyclohexene-4,5-dicarboxylic acid, or its anhydride is preferred for its low conductivity. The tetrahydrophthalic acid or its anhydride may have an optional substituent so long as such a substituent does not adversely affect the effect of the present invention.

In the present invention, to obtain an electrolyte containing the tetrahydrophthalic acid, its anhydride or its salt, such a substance may directly be added to an organic polar solvent. Alternatively, such a substance may be formed in the solvent by adding a precursor capable of forminig such a substance in the solvent, separately to the solvent. The use of a quaternary ammonium salt of the cycloalkene carboxylic acid is effective also for suppressing an increase of leakage current during a high temperature storage.

The quaternary ammonium salt of the tetrahydrophthalic acid is preferably an acidic salt for the same reason as mentioned above.

The unsaturated aliphatic carboxylic acid is preferably an unsaturated aliphatic dibasic acid. Specifically, it preferably has from 2 to 12 carbon atoms, especially from 2 to 10 carbon atoms. It preferably has one unsaturated bond. Specific examples of such a preferred acid include maleic acid, fumaric acid, citraconic acid, mesaconic acid, itaconic acid, butene dicarboxylic acid and dimethylmaleic acid.

The quaternary ammonium salt of the unsaturated dibasic acid is preferably an acidic salt for the same reason as mentioned above.

In the present invention, to obtain an electrolyte containing the quaternary ammonium salt of the unsaturated aliphatic carboxylic acid, the quaternary ammonium salt may be added to an organic polar solvent. Alternatively, the quaternary ammonium salt may be formed in the solvent by adding starting materials capable of forming such a quaternary ammonium salt, for example, an unsaturated aliphatic carboxylic acid or its anhydride and a tetraalkylammonium hydroxide, separately to the solvent. For example, to obtain an electrolyte containing a quaternary ammonium salt of maleic acid, the quaternary ammonium salt may be added to an organic polar solvent, or the quaternary ammonium salt may be formed by reacting maleic acid with a substance capable of forming the quaternary ammonium salt, in the solvent.

In the present invention, the quaternary ammonium groups in the above-mentioned various quaternary ammonium salts, may be represented by the formula $R_4N^+$, wherein R is an alkyl group which may have an aryl group. As will be shown in the Examples, substituents R attached to nitrogen may be the same or different from each other. The alkyl group as R preferably has from 1 to 10 carbon atoms, more preferably from 1 to 3 carbon atoms, in view of the excellent solubility to the organic polar solvent and excellent stability at high temperatures. Further, the electrolyte of the present invention has a merit such that it is highly resistant to chlorine.

In the present invention, as the organic polar solvent, any organic polar solvent which is commonly used for electrolytic capacitors, can be used. As a preferred solvent, an amide, a lactone, a glycol, a sulfur compound, a ketone, an ether, an ester, or a carbonate may be used. Specific examples of such a preferred solvent include propylene carbonate N,N-dimethylformamide, N-methylformamide, γ-butylolactone, N-methylpyrrolidone, dimethylsulfoxide, ethylenecyanohydrine, ethylene glycol, an ethylene glycol mono- or di-alkyl ether, a 3-alkyl-1,3-oxazolidin-2-on and phenyl acetate.

The content of the solute in the organic polar solvent may be selected from a wide range. However, the specific resistance is minimum when the solution is under a saturated condition. Thus, the content (concentration) of the solute is preferably from 1 to 50% by weight, more preferably from 5 to 40% by weight, in the electrolyte.

In the present invention, the pH of the electrolyte is controlled preferably at a level of from 4 to 8, more preferably from 5 to 7, by an addition of a suitable pH controlling agent.

The electrolytic capacitor of the present invention includes various types of capacitors. In a typical type, an aluminum foil anode and an aluminum foil cathode separated by a suitable separator such as paper, are used, and they are rolled into a cylindrical shape to obtain a capacitor element, and an electrolyte is impregnated to this capacitor element. The amount of the impregnated electrolyte is preferably from 50 to 300% by weight relative to the separator. The capacitor element impregnated with the electrolyte is accomodated and sealed in a casing made of a corrosion resistant metal such as aluminum, or a synthetic resin.

Now, the present invention will be described in further detail with reference to Examples. However, it shoud be understood that the present invention is by no means restricted to these specific Examples, and various changes or modifications may be made within the scope of the present invention.

EXAMPLES 1 TO 16 AND COMPARATIVE EXAMPLES 1 TO 4

In each Example, an aqueous tetraalkylammonium hydroxide solution (10% aqueous solution) and an aromatic carboxylic acid were mixed in equal equivalent amounts and dissolved, and water was removed therefrom by an evaporator to obtain a solid salt. The salt was dissolved as a solute in an organic polar solvent, and the solution was adjusted to a pH of from 5 to 7, if necessary by an addition of the same aromatic carboxylic acid as used above, to obtain an electrolyte. By using various electrolytes thus prepared, electrolytic capacitors having aluminum electrodes (prescribed for 10 V, 1000 μF) were prepared, and the changes in tan δ in the high temperature life tests (125° C.) were measured. The results are shown in Table 1 together with the results of the Comparative Examples.

In the following Tables, DMF means N,N-dimethylformamide, M.O. means 3-methyl-1,3-oxazolidin-2-on, and E.O. means 3-ethyl-1,3-oxazolidin-2-on.

TABLE 1

| Example No. | Electrolyte composition (% by weight) | | Change in tan δ (10 V, 125° C.) Initial | After 1000 hrs |
|---|---|---|---|---|
| Comparative Example 1 | Ammonium adipate<br>Ethylene glycol | 10%<br>90% | 0.14 | 0.36 |
| Comparative Example 2 | Triethylamine o-phthalate<br>γ-Butyrolactone | 26%<br>74% | 0.11 | 0.13 |
| Example 1 | Tetramethylammonium o-phthalate<br>γ-Butyrolactone | 25%<br>75% | 0.07 | 0.08 |
| Example 2 | Tetraethylammonium salicylate<br>DMF<br>Ethylene glycol | 29%<br>35%<br>36% | 0.06 | 0.07 |
| Example 3 | Tetrapropylammonium benzoate<br>γ-Butyrolactone<br>Ethylene glycol<br>Water | 30%<br>57%<br>12%<br>1% | 0.09 | 0.09 |
| Example 4 | Tetramethylammonium pyromellitate | 21% | 0.08 | 0.08 |

TABLE 1-continued

| Example No. | Electrolyte composition (% by weight) | | Change in tan δ (10 V, 125° C.) Initial | After 1000 hrs |
|---|---|---|---|---|
| | Propylene carbonate | 79% | | |
| Comparative Example 3 | Tetramethylammonium adipate | 26% | 0.15 | 0.28 |
| | γ-Butyrolactone | 74% | | |
| Comparative Example 4 | Triethylamine maleate | 26% | 0.08 | 0.33 |
| | γ-Butyrolactone | 74% | | |
| Example 5 | Tetramethylammonium o-phthalate | 26% | 0.06 | 0.07 |
| | γ-Butyrolactone | 73% | | |
| | Water | 1% | | |
| Example 6 | Tetraethylammonium o-phthalate | 31% | 0.06 | 0.07 |
| | DMF | 34% | | |
| | Ethylene glycol | 35% | | |
| Example 7 | Tetrapropylammonium o-phthalate | 34% | 0.08 | 0.09 |
| | γ-Butyrolactone | 53% | | |
| | Ethylene glycol | 12% | | |
| | Water | 1% | | |
| Example 8 | Tetrapropylammonium o-phthalate | 34% | 0.09 | 0.10 |
| | γ-Butyrolactone | 50% | | |
| | 1,3-Dimethyl-2-imidazoridinone | 16% | | |
| Example 9 | Tetraethylammonium o-phthalate | 31% | 0.09 | 0.10 |
| | Propylene carbonate | 69% | | |
| Example 10 | Tetraethylammonium o-phthalate | 31% | 0.08 | 0.09 |
| | γ-Butyrolactone | 38% | | |
| | Sulforane | 31% | | |
| Example 11 | Tetramethylammonium o-phthalate | 26% | 0.06 | 0.07 |
| | γ-Butyrolactone | 37% | | |
| | γ-Valerolactone | 37% | | |
| Example 12 | Tetraethylammonium o-phthalate | 31% | 0.08 | 0.09 |
| | β-Butyrolactone | 69% | | |
| Example 13 | Tetramethylammonium o-phthalate | 26% | 0.08 | 0.09 |
| | γ-Butyrolactone | 60% | | |
| | M.O. | 14% | | |
| Example 14 | Tetramethylammonium o-phthalate | 26% | 0.07 | 0.08 |
| | γ-Butyrolactone | 59% | | |
| | E.O. | 14% | | |
| | Water | 1% | | |
| Example 15 | Tetramethylammonium o-phthalate | 31% | 0.05 | 0.11 |
| | γ-Butyrolactone | 47% | | |
| | M.O. | 12% | | |
| | DMF | 10% | | |
| Example 16 | Tetraethylammonium o-phthalate | 34% | 0.06 | 0.10 |
| | γ-Butyrolactone | 43% | | |
| | DMF | 23% | | |

EXAMPLES 17 TO 20 AND COMPARATIVE EXAMPLES 5 TO 7

The preparation and tests of the capacitors were conducted in the same manners as in Examples 1 to 16 except that the prescription of the capacitors was changed from 10 V to 16 V, and the electrolyte was as shown in Table 2. The results are shown in Table 2.

TABLE 2

| Example No. | Electrolyte composition (% by weight) | | Change in tan δ (16 V, 125° C.) Initial | After 1000 hrs |
|---|---|---|---|---|
| Comparative Example 5 | Triethylamine benzoate | 26% | 0.13 | 0.15 |
| | γ-Butyrolactone | 74% | | |
| Comparative Example 6 | Triethylamine maleate | 20% | 0.08 | 0.33 |
| | γ-Butyrolactone | 65% | | |
| | Ethylene glycol | 15% | | |
| Comparative Example 7 | Ammonium borodisalicylate | 13% | 0.07 | 0.19 |
| | Ethylene glycol | 27% | | |
| | DMF | 60% | | |
| Example 17 | Tetramethylammonium benzoate | 26% | 0.08 | 0.09 |
| | γ-Butyrolactone | 60% | | |
| | M.O. | 14% | | |
| Example 18 | Tetramethylammonium benzoate | 26% | 0.06 | 0.07 |
| | γ-Butyrolactone | 59% | | |
| | E.O. | 14% | | |
| | Water | 1% | | |
| Example 19 | Tetramethylammonium benzoate | 31% | 0.08 | 0.09 |
| | γ-Butyrolactone | 47% | | |
| | M.O. | 12% | | |
| | DMF | 10% | | |
| Example 20 | Tetraethylammonium benzoate | 31% | 0.12 | 0.12 |
| | γ-Butyrolactone | 30% | | |
| | M.O. | 9% | | |
| | Propylene carbonate | 30% | | |

EXAMPLES 21 TO 23 AND COMPARATIVE EXAMPLES 8 AND 9

In each Example, tetrahydrophthalic acid, its anhydride or its salt as identified in Table 3 was dissolved as a solute in an organic polar solvent, and the pH was adjusted to a level from 5 to 7, if necessary, by an addition of a carboxylic acid, to obtain an electrolyte.

By using various electrolytes thus prepared, electrolytic capacitors having aluminum electrodes (prescribed for 100 V, 47 µF) were prepared, and the changes in tan δ and in the leakage current in the high temperature storage tests (125° C.) were measured. The results are shown in Table 3 together with the results of the Comparative Examples.

EXAMPLES 24 TO 34 AND COMPARATIVE EXAMPLES 10 TO 13

In each Example, an aqueous tetraalkylammonium hydroxide solution and an unsaturated aliphatic dibasic carboxylic acid were mixed in equal equivalent amounts and dissolved, and water was removed therefrom by an evaporator to obtain a geled or powder salt.

The salt was dissolved as a solute in an organic polar solvent, and the solution was adjusted to a pH of from 5 to 7, if necessary, by an addition of the same unsaturated dibasic carboxylic acid as used above, to obtain an electrolyte.

By using various electrolytes thus prepared, electrolytic capacitors having aluminum electrodes (prescribed for 10 V, 1000 µF) were prepared, and the changes in tan δ in the high temperature life tests (105° C.) were measured. The results are shown in Table 4 together with the results of the Comparative Examples.

TABLE 3

| Example No. | Electrolyte composition (% by weight) | | Change in tan δ (100 V, 125° C.) Initial | After 1000 hrs | Leakage current (µA) Initial | After 1000 hrs |
|---|---|---|---|---|---|---|
| Comparative Example 8 | Ammonium adipate<br>Ethylene glycol | 10%<br>90% | 0.020 | 0.026 | 0.43 | 8.2 |
| Comparative Example 9 | Triethylamine adipate<br>γ-Butyrolactone<br>Water | 10%<br>85%<br>5% | 0.032 | 0.036 | 0.42 | 4.3 |
| Example 21 | Tetramethylammonium tetrahydrophthalate<br>γ-Butyrolactone<br>γ-Ethylene glycol | 20%<br>70%<br>10% | 0.019 | 0.019 | 0.24 | 0.75 |
| Example 22 | Tetraethylammonium tetrahydrophthalate<br>γ-Butyrolactone | 20%<br>80% | 0.010 | 0.010 | 0.30 | 0.80 |
| Example 23 | Tetramethylammonium tetrahydrophthalate<br>DMF<br>Ethylene glycol | 20%<br>40%<br>40% | 0.017 | 0.019 | 0.23 | 0.78 |

TABLE 4

| Example No. | Electrolyte composition (% by weight) | | Change in tan δ (10 V, 105° C.) Initial | After 1000 hrs |
|---|---|---|---|---|
| Comparative Example 10 | Ammonium adipate<br>Ethylene glycol | 10%<br>90% | 0.14 | 0.25 |
| Comparative Example 11 | Tetramethylammonium adipate<br>Adipic acid<br>Ethylene glycol<br>γ-Butyrolactone<br>Water | 24%<br>5%<br>14%<br>55%<br>2% | 0.13 | 0.21 |
| Comparative Example 12 | Triethylamine maleate<br>Ethylene glycol<br>γ-Butyrolactone<br>Water | 30%<br>14%<br>55%<br>1% | 0.10 | 0.23 |
| Comparative Example 13 | Triethylamine adipate<br>Adipic acid<br>Ethylene glycol<br>γ-Butyrolactone<br>Water | 25%<br>10%<br>13%<br>50%<br>2% | 0.28 | 0.41 |
| Example 24 | Tetramethylammonium maleate<br>Maleic acid<br>Ethylene glycol<br>γ-Butyrolactone<br>Water | 25%<br>9%<br>13%<br>50%<br>3% | 0.09 | 0.10 |
| Example 25 | Tetraethylammonium itaconate<br>Itaconic acid<br>Propylene carbonate<br>Water | 20%<br>10%<br>69%<br>1% | 0.12 | 0.15 |
| Example 26 | Tetramethylammonium fumarate<br>Fumaric acid<br>DMF<br>Water | 25%<br>10%<br>63.5%<br>1.5% | 0.13 | 0.14 |
| Example 27 | Tetramethylammonium citraconate<br>Citraconic acid<br>N—Methylpyrrolidone | 20%<br>5%<br>50% | 0.07 | 0.08 |

TABLE 4-continued

| Example No. | Electrolyte composition (% by weight) | | Change in tan δ (10 V, 105° C.) | |
|---|---|---|---|---|
| | | | Initial | After 1000 hrs |
| Example 28 | Diethylene glycol | 25% | 0.14 | 0.16 |
| | Tetrapropylammonium dimethylmaleate | 15% | | |
| | Dimethylmaleic acid | 5% | | |
| | Dimethylsulfoxide | 79% | | |
| | Water | 1% | | |
| Example 29 | Phenyltrimethylammonium maleate | 20% | 0.12 | 0.15 |
| | Maleic acid | 5% | | |
| | Ethylenecyanohydrine | 37% | | |
| | γ-Butyrolactone | 37% | | |
| | Water | 1% | | |
| Example 30 | Tetramethylammonium 1-butene-2,4-dicarboxylate | 10% | 0.14 | 0.18 |
| | 1-Butene-2,4-dicarboxylate | 5% | | |
| | Ethylene glycol | 75% | | |
| | γ-Butyrolactone | 10% | | |
| Example 31 | Tetraethylammonium maleate | 20% | 0.07 | 0.07 |
| | γ-Butyrolactone | 80% | | |
| Example 32 | Tetraethylammonium citraconate | 20% | 0.08 | 0.08 |
| | γ-Butyrolactone | 80% | | |
| Example 33 | Tetramethylammonium dimethylmaleate | 20% | 0.07 | 0.07 |
| | γ-Butyrolactone | 80% | | |
| Example 34 | Tetraethylammonium dimethylmaleate | 20% | 0.09 | 0.09 |
| | γ-Butyrolactone | 80% | | |

EXAMPLES 35 TO 38

The preparation and the tests of capacitors were conducted in the same manners as in Examples 24 to 34 except that the prescription of the capacitors was changed to 35 V, 220 μF. The results are shown in Table 5.

TABLE 5

| Example No. | Electrolyte composition (% by weight) | | Change in tan δ (35 V, 105° C.) | |
|---|---|---|---|---|
| | | | Initial | After 1000 hrs |
| Example 35 | Tetramethylammonium maleate | 26% | 0.025 | 0.027 |
| | γ-Butyrolactone | 60% | | |
| | M.O. | 14% | | |
| Example 36 | Tetramethylammonium maleate | 26% | 0.022 | 0.024 |
| | γ-Butyrolactone | 59% | | |
| | E.O. | 14% | | |
| | Water | 1% | | |
| Example 37 | Tetramethylammonium maleate | 31% | 0.019 | 0.022 |
| | γ-Butyrolactone | 47% | | |
| | M.O. | 12% | | |
| | DMF | 10% | | |
| Example 38 | Tetraethylammonium maleate | 34% | 0.025 | 0.027 |
| | γ-Butyrolactone | 43% | | |
| | M.O. | 13% | | |
| | DMF | 10% | | |

What is claimed is:

1. An electrolytic capacitor comprising a capacitor element and an electrolyte impregnated to the element, wherein the electrolyte comprises an organic polar solvent and a solute dissolved in the solvent, said solute being selected from the group consisting of a quaternary ammonium salt of an aromatic carboxylic acid, a quaternary ammonium salt of cycloalkene carboxylic acid and a quaternary ammonium salt of an unsaturated aliphatic carboxylic acid.

2. The electrolytic capacitor according to claim 1, wherein the aromatic carboxylic acid is an aromatic monobasic, dibasic, tribasic or tetrabasic acid.

3. The electrolytic capacitor according to claim 2, wherein the aromatic carboxylic acid is phthalic acid or benzoic acid.

4. The electrolytic capacitor according to claim 3, wherein the phthalic acid is o-phthalic acid.

5. The electrolytic capacitor according to claim 2, wherein the quaternary ammonium salt of the aromatic dibasic, tribasic or tetrabasic acid is an acidic salt.

6. The electrolytic capacitor according to claim 1, wherein the cycloalkene carboxylic acid is tetrahydrophthalic acid.

7. The electrolytic capacitor according to claim 6, wherein the quaternary ammonium salt of tetrahydrophthalic acid is an acidic salt.

8. The electrolytic capacitor according to claim 1, wherein the unsaturated aliphatic carboxylic acid has from 2 to 12 carbon atoms in the aliphatic moiety.

9. The electrolytic capacitor according to claim 8, wherein the unsaturated aliphatic carboxylic acid is an unsaturated aliphatic dibasic acid.

10. The electrolytic capacitor according to claim 9, wherein the quaternary ammonium salt of the unsaturated aliphatic dibasic acid is an acidic salt.

11. The electrolytic capacitor according to claim 9, wherein the unsaturated aliphatic dibasic carboxylic acid is maleic acid.

12. The electrolytic capacitor according to claim 1, wherein the solute is present in an ammount of from 1 to 50% by weight in the organic polar solvent.

13. The electrolytic capacitor according to claim 1, wherein the quaternary ammonium group is represented by $R_4N^+$ wherein R is an alkyl group having from 1 to 10 carbon atoms.

* * * * *